United States Patent

Ikawa et al.

[11] Patent Number: 5,960,336
[45] Date of Patent: Sep. 28, 1999

[54] DATA RECEIVING APPARATUS

[75] Inventors: Keiichi Ikawa, Kawasaki; Tetsuaki Nakanishi, Yokohama; Kazuhisa Tsubaki, Yokohama; Kazuhiro Umetsu, Yokohama; Tadao Takami, Yokosuka, all of Japan

[73] Assignees: Matsushita Communication Industrial Co., Ltd., Yokohama; NTT Mobile Communications Network Inc., Tokyo, both of Japan

[21] Appl. No.: 08/851,084

[22] Filed: May 6, 1997

[30] Foreign Application Priority Data

May 14, 1996 [JP] Japan .................................. 8-119267

[51] Int. Cl.⁶ ..................................................... H04B 1/06
[52] U.S. Cl. ..................................... 455/277.2; 455/277.1; 455/278.2; 375/347; 375/316
[58] Field of Search .............................. 455/277.1, 277.2, 455/278.1, 133, 134; 375/316, 324, 340, 347

[56] References Cited

U.S. PATENT DOCUMENTS

| | | | |
|---|---|---|---|
| 5,541,963 | 7/1996 | Nakagoshi | 455/133 |
| 5,566,364 | 10/1996 | Mizoguchi et al. | 455/277.1 |
| 5,781,592 | 12/1998 | Masuda | 455/133 |

*Primary Examiner*—Wellington Chin
*Assistant Examiner*—Congvan Tran
*Attorney, Agent, or Firm*—Venable; Allen Wood; Catherine A. Ferguson

[57] ABSTRACT

A data receiving apparatus is constructed to make comparison of received signal strength of a plurality of receiving antennas by making use of timing of a sync word, which is not necessary for making synchronization acquisition, among a plurality of sync words contained in a subframe of a receiving signal, and then to select a receiving antenna of the highest received signal strength from among the plurality of receiving antennas, in accordance with a result of the comparison made before then.

4 Claims, 4 Drawing Sheets

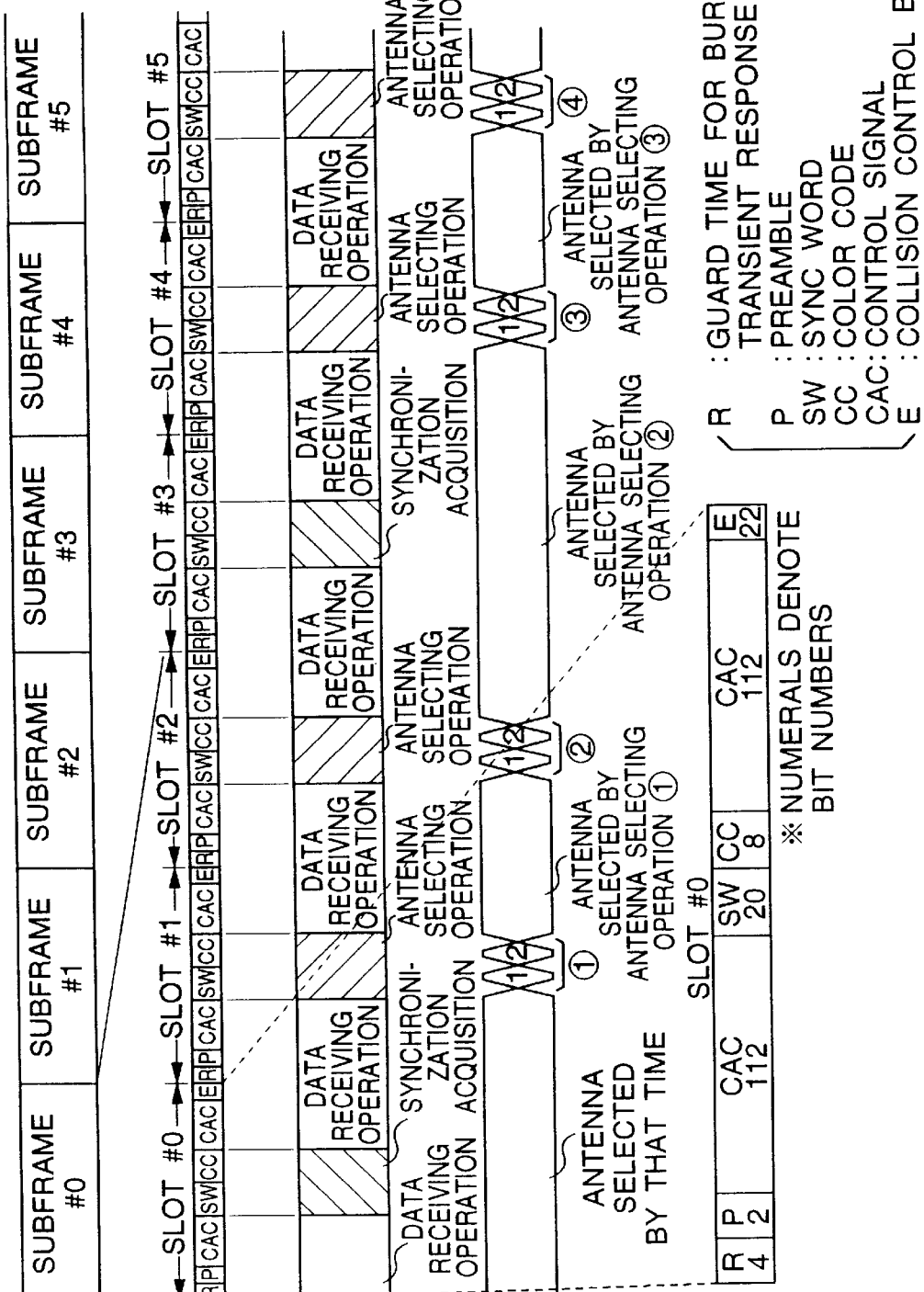

DATA RECEIVING APPARATUS

BACKGROUND OF THE INVENTION

1. Field of the Invention

The present invention relates to a data receiving apparatus, particularly to a data receiving apparatus on the PDC (Personal Digital Cellular) system which adopts the TDMA (Time Division Multiple Access) system, wherein a continuous receiving state arises extending over one subframe period or more of a receiving signal.

2. Description of the Related Art

A receiving radio wave transmitted from a base station through a propagation path to a data receiving apparatus is subjected to fluctuations called fading. This fading is a cause of deterioration in the quality of the received radio wave. Accordingly, it is necessary to reduce the effect of fading in order to realize high quality radio wave transmission. One of technical measures for reducing the influence of fading is a diversity reception technique. In this technique, the influence of fading is reduced by using two or more receiving antennas set up leaving a sufficient space therebetween. Then, since the influence of fading on an incoming radio wave received by each of the receiving antennas is considered to be independent of each other, by making switching between a plurality of receiving antennas thereby to select a receiving antenna to which a receiving radio wave in a favorable receptions state is incoming, it is possible to reduce the influence of fading.

As shown in FIG. 1, a data receiving apparatus adopting the conventional selective diversity system of this kind includes a first receiving antenna 11 and a second receiving antenna 12 set up apart from each other leaving a sufficient space therebetween, a first receiver 13 and a second receiver 14, a selector 15 and a switching unit 16.

A radio wave received by the first antenna 11 is demodulated and transformed into first demodulation data through the first receiver 13. The first demodulation data are inputted into the switching unit 16. The first receiver 13 detects received signal strength of the first antenna 11, and the detected received signal strength is inputted into the selector 15. On the other hand, a radio wave received by the second antenna 12 is demodulated and transformed into second demodulation data through the second receiver 14. The second demodulation data are inputted into the switching unit 16. The second receiver 14 detects received signal strength of the second antenna 12, and the detected received signal strength is inputted into the selector 15. The selector 15 makes a comparison between the received signal strength inputted from the first receiver 13 and the received signal strength inputted from the second receiver 14, and selects a receiver from which higher received signal strength is inputted. The switching unit 16 makes a switching between the first demodulation data inputted from the first receiver 13 and the second demodulation data inputted from the second receiver 14 in accordance with a result of a selection made by the selector 15, and either one of the demodulation data chosen by a switching made by the switching unit 16 is outputted from the switching unit 16 through an output terminal 17. In this case, the comparison of the received signal strength by the selector 15 and the switching of the demodulation data by the switching unit 16 are performed at every symbol.

Next, an explanation will be made of reception timing of this data receiving apparatus by making reference to FIGS. 2A to 2E. As shown in FIGS. 2A and 2B, when a subframe of a signal transmitted from a base station to the data receiving apparatus is divided into three slots, one slot of a subframe of a signal in a voice transmission on the ordinary PDC system is for the exclusive use of data directed to the present receiving timing, whereas in the PDC system in which a continuous receiving state arises extending over one subframe period or more, it may be the case that all three slots in a subframe are for the use of data directed to the present receiving timing. In such a case where all three slots in a subframe are for the use of data directed to the present receiving timing, as shown in FIGS. 2B and 2E, the arrangement of data in each slot of each subframe of a signal sent through a forward channel is in the order of guard time R for burst transient response in 4 bits, preamble P in 2 bits, control signal CAC in 112 bits, sync word SW in 20 bits, color code CC in 8 bits, control signal CAC in 112 bits and collision control bits E in 22 bits. Then, data reception is performed in the data receiving apparatus at the operation timing shown at FIG. 2C. That is, in each slot, synchronization acquisition is performed by the use of the sync word SW and the color code CC, and data reception is performed at the other timing. Also, in the data receiving apparatus, an operation of selective diversity after detection is performed continuously through the data receiving periods, as shown in FIG. 2D, so that data demodulation by a continuous receiving operation may be achieved.

However, with the above-described conventional data receiving apparatus, it is necessary to always put two systems of receivers into operation and to make a switching between the two systems of receivers at every symbol, and further it is also necessary for the selector and switching unit to continue their respective operations at every symbol. As a result, electric power consumption increases, and further the circuit size and cost of the data receiving apparatus are increased due to its provision of two systems of receivers.

SUMMARY OF THE INVENTION

The object of the present invention is to provide a data receiving apparatus capable of performing a selective diversity receiving operation only with a single system of receiver, thereby making respective reductions in the circut size, cost, and electric power consumption of the data receiving apparatus.

In order to attain the above-mentioned object, the data receiving apparatus of the present invention is constructed so that it performs an antenna selecting diversity operation by making use of the timing of a sync word or both sync word and color code which are not necessary for making synchronization acquisition when receiving data directed to the present receiving timing, whereby it is possible to get a diversity effect only with a single system of receiver and thereby to make respective reductions in the circuit size, cost, and electric power consumption of the data receiving apparatus.

The first data receiving apparatus of the present invention comprises: comparison means for making comparison of received signal strength of a plurality of receiving antennas by making use of timing of a sync word, which is not necessary for making synchronization acquisition, among a plurality of sync words contained in a subframe of a receiving signal; and selecting means for selecting a receiving antenna of the highest received signal strength from among the plurality of receiving antennas, in accordance with a result of the comparison made by the comparison means.

Here, it may be also possible for the comparison means to make the comparison of the received signal strength of each of the plurality of receiving antennas by making use of timing of a color code, which is not necessary for making synchronization acquisition, among a plurality of color codes contained in the subframe of the receiving signal.

The second data receiving apparatus of the present invention comprises: a plurality of receiving antennas for receiving a radio wave; an antenna switching unit for making a switching among the plurality of receiving antennas; a receiver for demodulating data from the radio wave received by one of the plurality of receiving antennas which is switched by the antenna switching unit, and for detecting received signal strength of each of the plurality of receiving antennas by making use of timing of a sync word, which is not necessary for making synchronization acquisition, among a plurality of sync words contained in a subframe of a receiving signal; and a selector for controlling an operation of the antenna switching unit in accordance with the received signal strength of the plurality of receiving antennas detected by the receiver so as to be able to select a receiving antenna of the highest received signal strength from among the plurality of receiving antennas.

Here, it may be also possible for the receiver to detect the received signal strength of each of the plurality of receiving antennas by making use of timing of a color code, which is not necessary for making synchronization acquisition, among a plurality of color codes contained in the subframe of the receiving signal.

BRIEF DESCRIPTION OF THE DRAWINGS

FIGS. 4A to 4E are explanatory diagrams illustrating the timing of a data receiving operation of the data receiving apparatus shown in FIG. 3.

DESCRIPTION OF THE PREFERRED EMBODIMENTS

Figure 1:
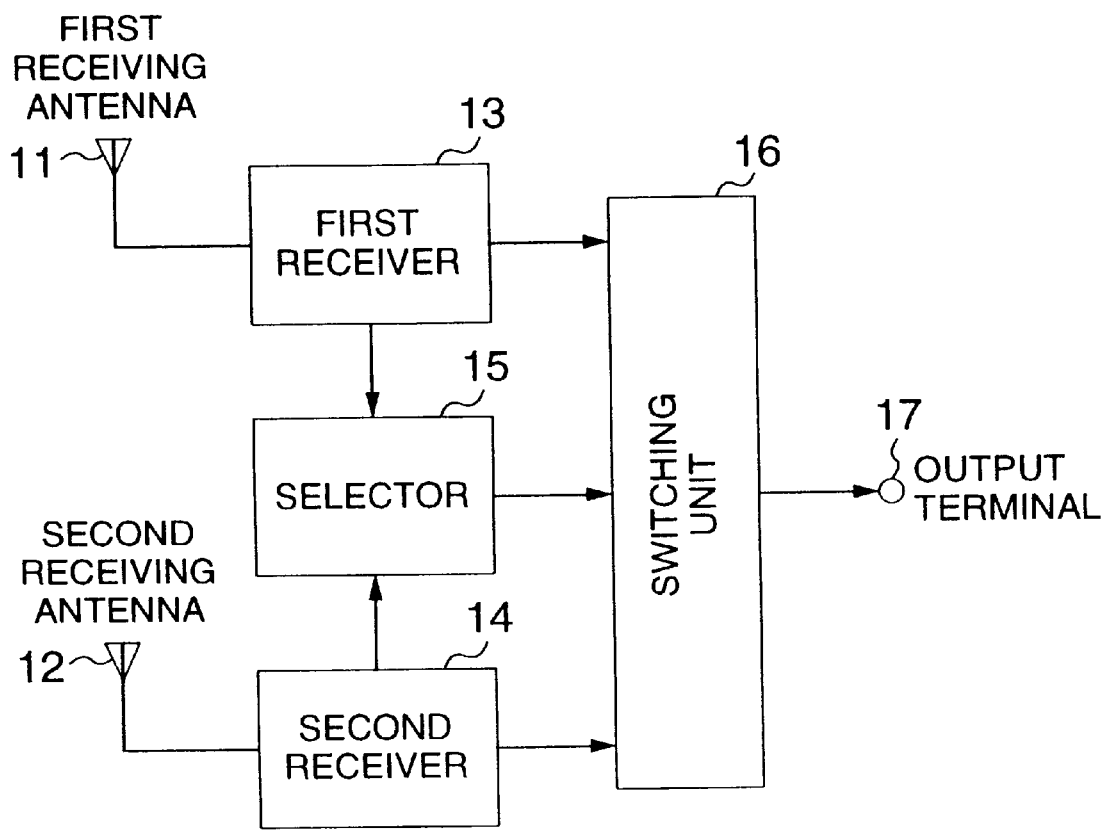
FIG. 1 is a block diagram showing a schematic structure of a conventional data receiving apparatus.
Figures 2A, 2B, 2C, 2D, 2E:
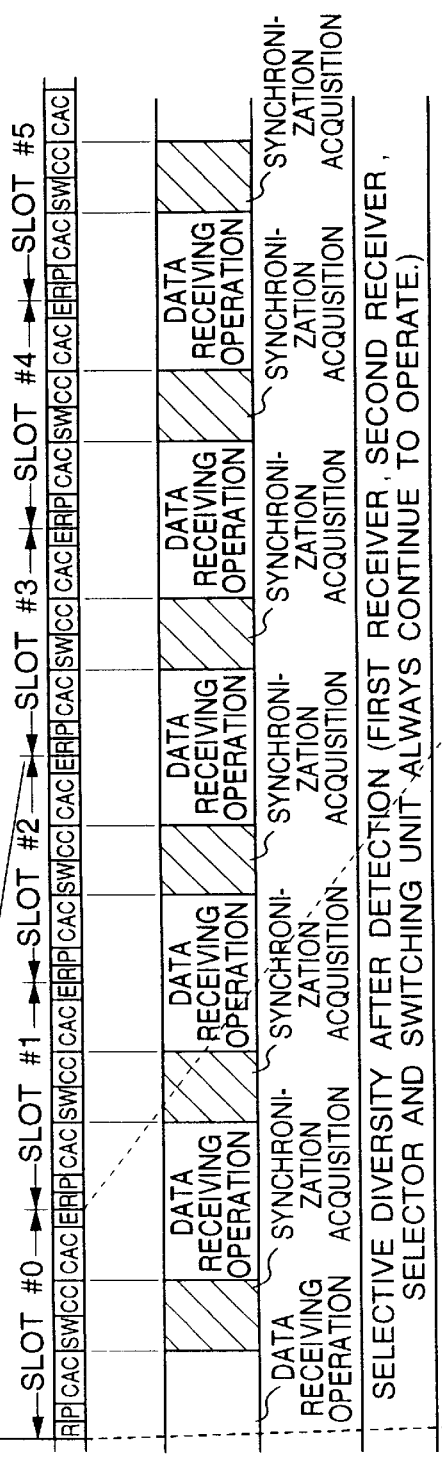
FIGS. 2A to 2E are explanatory diagrams illustrating the timing of a data receiving operation of the conventional data receiving apparatus shown in FIG. 1.
Figure 3:
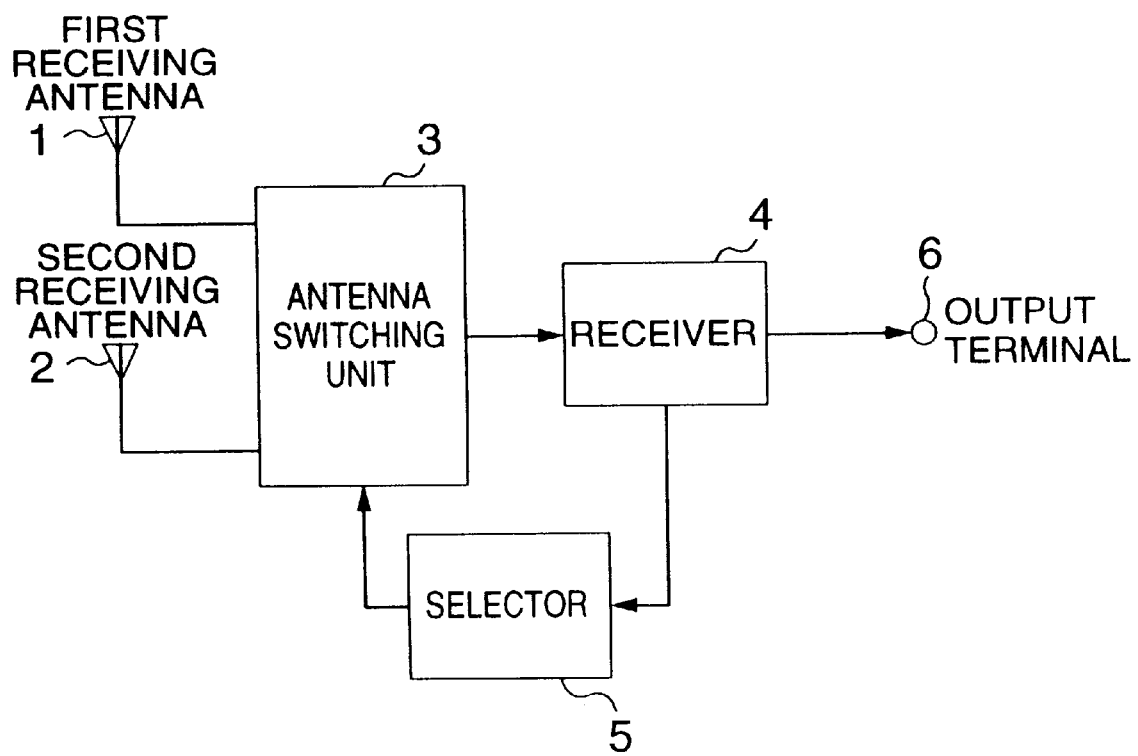
FIG. 3 is a block diagram showing a schematic structure of a data receiving apparatus of an embodiment of the present invention.

Referring to FIG. 3, a data receiving apparatus of an embodiment of the present invention comprises a first receiving antenna 1 and a second receiving antenna 2, an antenna switching unit 3, a receiver 4 and a selector 5. The first antenna 1 and the second antenna 2 are set up apart from each other, leaving a sufficient space therebetween, and operate to receive a radio wave transmitted from a base station. The antenna switching unit 3 makes a switching between the first antenna 1 and the second antenna 2 in accordance with a control signal supplied from the selector 5 and connects either one of the first antenna 1 and the second antenna 2, which has been chosen by a switching made by the antenna switching unit 3, to the receiver 4.

The receiver 4 operates to demodulate data from the radio wave received by either one of the first antenna 1 and the second antenna 2 which has been connected thereto by the antenna switching unit 3, and to detect received signal strength of the first antenna 1 and that of the second antenna 2. At this time, the detection of the received signal strength of the first antenna 1 and that of the second antenna 2 is performed by making use of the timing of sync words, which are not necessary for making synchronization acquisition, among a plurality of sync words contained in subframes of demodulated data. For this purpose, at this timing, the receiver 4 supplies an instruction signal to the selector 5 to make the selector 5 control the antenna switching unit 3 so that the antenna switching unit 3 makes a switching between the first antenna 1 and the second antenna 2 thereby to cause both of them to be connected to the receiver 4 once at least. The selector 5 produces a control signal in accordance with the instruction signal supplied from the receiver 4 and outputs the control signal to the antenna switching unit 3, whereby the received signal strength of the first antenna 1 and that of the second antenna 2 are detected sequentially by the receiver 4. The selector 5 makes a comparison between the received signal strength of the first antenna 1 and that of the second antenna 2, both of which have been detected by the receiver 4, and produces a control signal and supplies it to the antenna switching unit 3, thereby enabling the antenna switching unit 3 to choose a receiving antenna of the higher received signal strength.

Further, while the detection of the received signal strength of each of the first antenna 1 and the second antenna 2 by the receiver 4 is performed by making use of the timing of sync words, which are not necessary for making synchronization acquisition, among a plurality of sync words contained in subframes of demodulated data, it may be performed also by making use of the timing of sync words and color codes, neither of which are necessary for making synchronization acquisition, among a plurality of sync words and color codes contained in the subframes of demodulated data.

Next, an explanation will be made of reception timing of the data receiving apparatus of the current embodiment of the present invention by making reference to FIGS. 4A–4E. As described above, when one of subframes of the signal transmitted from the base station to the data receiving apparatus is divided into three slots as shown in FIGS. 4A and 4B, one slot of a subframe of a signal in a voice transmission on the ordinary PDC system is for the exclusive use of data directed to the present receiving timing, whereas in the PDC system in which a continuous receiving state arises extending over one subframe period or more, it may be the case that all three slots of a subframe are for the use of data directed to the present receiving timing. In such a case where all three slots of a subframe are for the use of data directed to the present receiving station, as shown in FIGS. 4B and 4E, the arrangement of data in each slot of each subframe of a signal sent through a forward channel is in the order of guard time R for burst transient response in 4 slots, preamble P in 2 bits, control signal CAC in 112 bits, sync word SW in 20 bits, color code CC in 8 bits, control signal CAC in 112 bits and collision control bits E in 22 bits.

The synchronization acquisition in the data receiving apparatus may be performed only by the use of at least one sync word SW and at least one color code CC, without requiring the use of all three sync words SW and all three color codes CC contained in one subframe. Accordingly, in the case where synchronization acquisition is performed by the use of a sync word SW and a color code CC contained in a leading slot of each subframe, as shown in FIG. 4C, the data receiving apparatus performs synchronization acquisition by the use of the sync word SW and the color code CC contained in the leading slot of each subframe, and performs an antenna selecting operation (namely, an antenna switching operation performed by the antenna switching unit 3 and a detecting operation performed by the receiver 4 to detect received signal strength of the first antenna 1 and that of the second antenna 2) at the timing of the sync word SW and the color code CC both of which are contained in each of two succeeding slots of each subframe. At the other timing, the data receiving apparatus performs respective data receiving operations. FIG. 4D shows that a receiving antenna selected by one antenna selecting operation is used continuously up to the start of the next antenna selecting operation. That is, a receiving antenna selected by one antenna selecting operation performed at the timing ① shown in FIG. 4D is used continuously until the next antenna selecting operation is started at the next timing ②.

In addition, it is not necessary for an operation of synchronization acquisition to be performed by the use of both of a sync word SW and a color code CC, but the operation of synchronization acquisition may be performed only by the use of a sync word SW. Thus, in the case where synchronization acquisition is performed by the use of a sync word SW contained in a leading slot of each subframe, the data receiving apparatus performs synchronization acquisition by the use of the sync word SW contained in the leading slot of each subframe, and then performs an antenna selecting operation at the timing of the sync word SW and the color code CC both of which are contained in each of two succeeding slots of each subframe. At the other timing, the data receiving apparatus performs respective data receiving operations.

As described in the foregoing, with the data receiving apparatus of the above-described embodiment of the present invention, when a subframe of a signal received by the data receiving apparatus is divided into three slots for example, synchronization acquisition is performed within one slot period and an antenna selecting operation is performed within each of two remaining slot periods. Accordingly, it is possible to perform an antenna selective diversity receiving operation only with a single system of receiver, thereby making respective reductions in the circuit size, cost, and electric power consumption of the data receiving apparatus.

What's claimed is:

1. A data receiving apparatus comprising:
   comparison means for making comparison of received signal strengths of a plurality of receiving antennas by making use of timing of a sync word and a color code, which are not necessary for synchronization acquisition, among a plurality of sync words and color codes contained in a subframe of a receiving signal; and
   selecting means for selecting a receiving antenna with the highest received signal strength from among said plurality of receiving antennas, in accordance with a result of the comparison made by said comparison means.

2. A data receiving apparatus comprising:
   a plurality of receiving antennas for receiving a radio wave;
   an antenna switching unit for switching between said plurality of receiving antennas;
   a receiver for demodulating data from said radio wave received by one of said plurality of receiving antennas, which is switched and chosen by said antenna switching unit, and for detecting a received signal strength of each of said plurality of receiving antennas by making use of timing of a color code and a sync word, which are not necessary for synchronization acquisition, among the plurality of color codes and sync words in said subframe of the receiving signal; and
   a selector for controlling an operation of said antenna switching unit in accordance with the received signal strengths of said plurality of receiving antennas detected by said receiver so as to select a receiving antenna with the highest signal strength from among said plurality of receiving antennas.

3. A data receiving apparatus for receiving a signal, in which a subframe is divided into a plurality of slots and each slot contains a sync word and a color code, comprising:
   comparison means for making a comparison of the received signal strengths of a plurality of said receiving antennas within slot periods other than that of one slot containing said sync word and said color code necessary for synchronization acquisition among said plurality of slots in the receiving signal; and
   selecting means for selecting a receiving antenna with the highest received signal strength from among said plurality of receiving antennas, in accordance with a result of the comparison made by said comparison means.

4. A data receiving apparatus for receiving a signal in which a subframe is divided into a plurality of slots and each of said slots contains s sync word, comprising:
   a plurality of receiving antennas for receiving a radio wave which conveys the receiving signal;
   an antenna switching unit for switching between said plurality of receiving antennas;
   a receiver for receiving the signal from said radio wave received by one of said plurality of receiving antennas which is switched and thereby chosen by said antenna switching unit, and for detecting a received signal strength of each of said plurality of receiving antennas within said slot periods other than that of one slot containing said sync word and said color code necessary for synchronization acquisition, among said plurality of slots in the receiving signal; and
   a selector for controlling an operation of said antenna switching unit in accordance with the received signal strength of said plurality of receiving antennas detected by said receiver so as to select a receiving antenna with the highest received signal strength.

* * * * *